United States Patent
Xu et al.

(10) Patent No.: US 7,552,044 B2
(45) Date of Patent: Jun. 23, 2009

(54) SIMULATED STORAGE AREA NETWORK

(75) Inventors: Minglei Xu, Bellevue, WA (US); Avinash Pillai, Redmond, WA (US); Hui Li, Redmond, WA (US); Paul Trunley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 11/525,690

(22) Filed: Sep. 22, 2006

(65) Prior Publication Data

US 2007/0250302 A1    Oct. 25, 2007

Related U.S. Application Data

(60) Provisional application No. 60/794,324, filed on Apr. 21, 2006.

(51) Int. Cl.
G06F 9/44 (2006.01)
(52) U.S. Cl. .............................. 703/20; 703/22; 714/42
(58) Field of Classification Search .................. 703/13, 703/14, 20–22; 714/40–43
See application file for complete search history.

(56) References Cited

U.S. PATENT DOCUMENTS

| | | | |
|---|---|---|---|
| 5,604,889 A * | 2/1997 | Pickens et al. ................ 703/15 |
| 5,615,335 A * | 3/1997 | Onffroy et al. ................ 714/30 |
| 5,752,005 A * | 5/1998 | Jones ........................... 703/22 |
| 5,978,576 A * | 11/1999 | Sanadidi et al. ............... 703/22 |
| 7,051,092 B2 * | 5/2006 | Lenz et al. ................... 709/221 |
| 2005/0154576 A1 * | 7/2005 | Tarui et al. ................... 703/22 |

OTHER PUBLICATIONS

Uhlig et al., R.A. Trace-Driven Memory Simulation: A Survey, ACM Computing Surveys, vol. 29, No. 2, Jun. 1997, pp. 1-43.*

* cited by examiner

Primary Examiner—Russell Frejd
(74) Attorney, Agent, or Firm—Workman Nydegger

(57) ABSTRACT

Aspects of the subject matter described herein relate to simulating storage devices. In aspects, a test automation engine instructs a simulator to simulate a storage device having certain characteristics such as a storage area network. The test automation engine then tests an application against the simulated storage device. Tests may include storage management requests and storage access requests. A provider may translate a request to one or more operations suitable to perform the request on the underlying simulated device. Shadow copies and the results of other storage management-related operations may be shared across computers via aspects of a simulation framework described herein.

19 Claims, 7 Drawing Sheets

SIMULATED STORAGE AREA NETWORK

CROSS REFERENCE TO RELATED APPLICATION

This application claims the benefit of U.S. Provisional application No. 60/794,324, filed Apr. 21, 2006, entitled SIMULATED STORAGE AREA NETWORK FOR TESTING STORAGE MANAGEMENT APPLICATIONS, which application is incorporated herein in its entirety.

BACKGROUND

Two ways to test a storage management application are to deploy a storage area network device or to use a hardware-based emulator. Testing a storage management application in either of these ways, however, has several disadvantages. First, storage area network devices or even hardware-based emulators can be very expensive and may involve dedicated personnel for setup and maintenance. Second, to test the application for each available storage array to ensure compatibility and correctness may be time consuming and add to the expense as a storage array or emulator for each vendor may be needed. Finally, sometimes new industry standards are created that no existing storage system supports.

SUMMARY

Briefly, aspects of the subject matter described herein relate to simulating storage devices. In aspects, a test automation engine instructs a simulator to simulate a storage device having certain characteristics such as a storage area network. The test automation engine then tests an application against the simulated storage device. Tests may include storage management requests and storage access requests. A provider may translate a request to one or more operations suitable to perform the request on the underlying simulated device. Shadow copies and the results of other storage management-related operations may be shared across computers via aspects of a simulation framework described herein.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompany figures in which like reference numerals indicate similar elements and in which:

DETAILED DESCRIPTION

Exemplary Operating Environment

Figure 1:
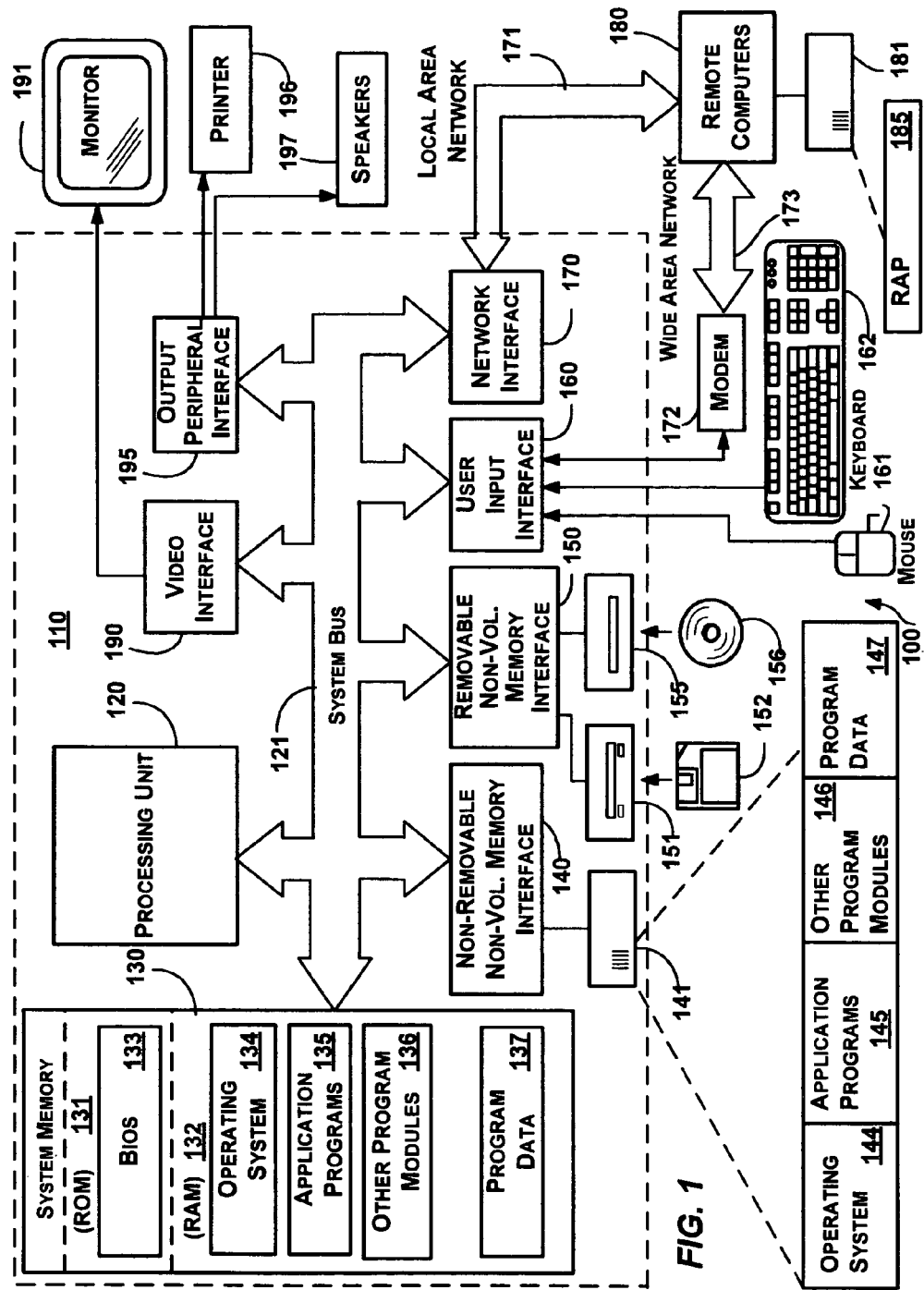
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA)

bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide are network (WAN) 173, but also may include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Simulation

Figure 2:
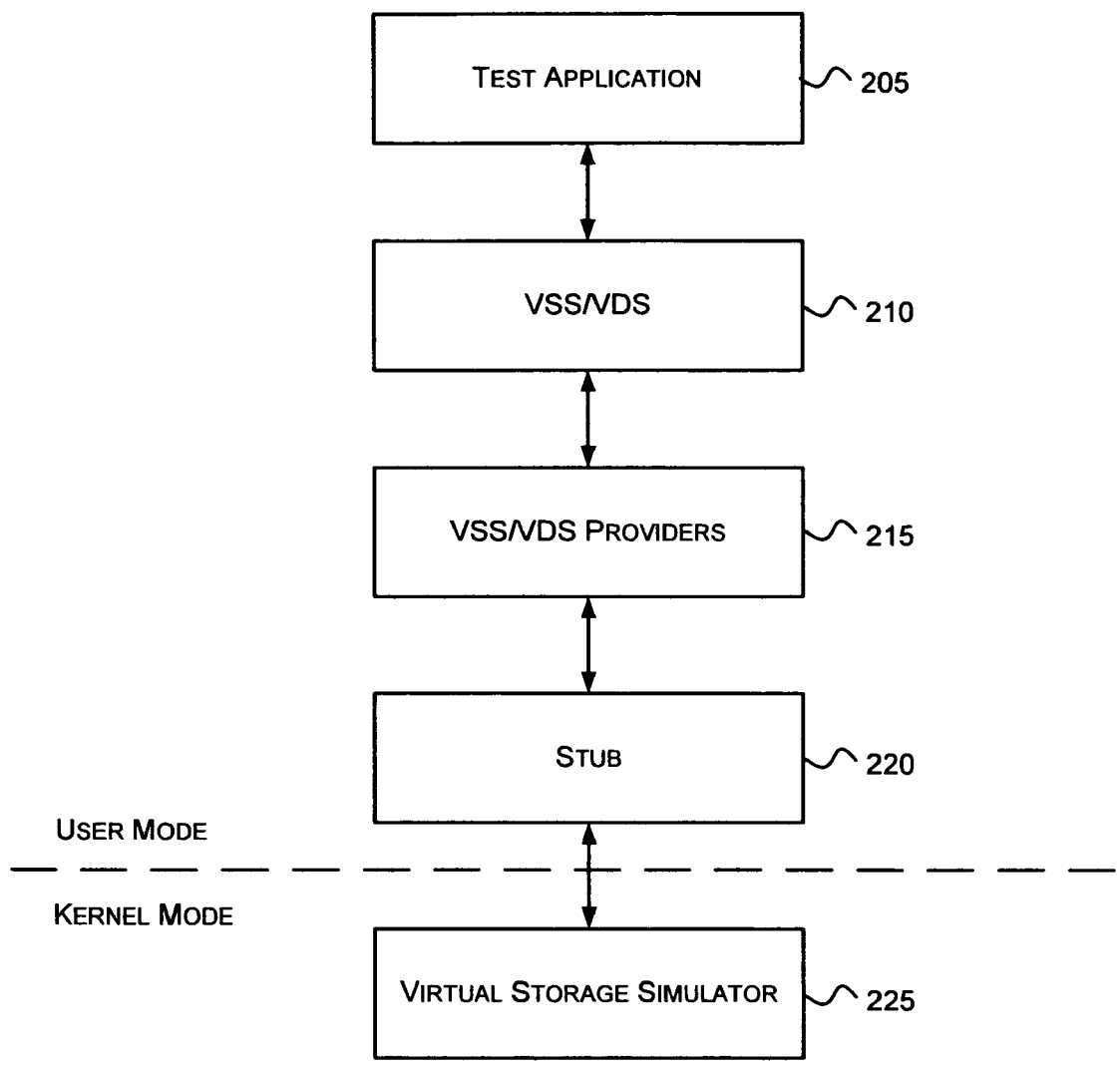
FIG. 2 is a block diagram representing an exemplary arrangement of components of a system in which aspects of the subject matter described herein may operate.

FIG. 2 is a block diagram representing an exemplary arrangement of components of a system in which aspects of the subject matter described herein may operate. The system includes a test application 205, a virtual shadow copy service (VSS) and a virtual disk service (VDS) 210, VSS/VDS providers 215, a stub 220, and a virtual storage driver 225.

In one embodiment, the test application 205, the VSS/VDS 210, the VSS/VDS Providers 215, and the stub 220 execute in user mode while the virtual storage driver 225 executes in kernel mode. In other embodiments, the virtual storage simulator 225 may execute in user mode.

The test application 205 is any program that is capable of testing one or more features of a storage area network (SAN), distributed storage, or other storage. A SAN may include storage elements, storage devices, computer systems, and/or storage appliances plus control software communicating over a network. In one embodiment, in a SAN, a computer issues a request for specific blocks or data segments from a specific logical unit number (LUN). A LUN may refer to a physical disk drive on the SAN or to a virtual partition (or volume) including portions or all of one or more physical disk drives of the SAN.

The test application 205 may include a specialized application such as a storage manager for managing a SAN, or an application capable of backup from and restore to a storage device, or any other application capable of reading from, writing to, or managing a storage device. The test application 205 may or may not be structured primarily to test storage devices. The test application 205 may be controlled by another application that instructs the test application 205 as to what operations to perform. Such an embodiment is described in further detail in conjunction with FIG. 5.

The VSS/VDS 210 are services that may be used in disk management. In one embodiment, the VSS/VDS 210 are part of the same component and may have a common interface. In other embodiments, the VSS and the VDS are separate components and may have separate interfaces. As one of its functions, the VSS may coordinate the creation of shadow copies. A shadow copy may be thought of as a "snapshot" of a volume. Logically, a shadow copy is a duplicate of a volume at a given point in time, even though the volume may not be entirely copied (e.g., via copy-on-write) in creating the shadow copy. A shadow copy may be viewed as a separate volume by the operating system and any executing applications. For example, a shadow copy may have a volume device, a volume name, a drive letter, a mount point, and any other attribute of an actual volume.

The VSS provides an interface through which an application (e.g., the test application 205) may request shadow copy operations for any supported storage device. The VSS works in conjunction with a VSS provider to perform a requested shadow copy operation. By providing an interface that may be used for any storage device, the VSS shields the application from nuances of the supported storage device.

The interface provided by the VSS may be an industry standard interface for managing storage devices or may be a proprietary interface. In one embodiment, the VSS provides an interface that corresponds to the VSS standards provided by Microsoft Corporation of Redmond Wash. In another embodiment, the VSS provides an interface that corresponds to a Storage Network Industry Association (SNIA) storage management standard. In other embodiments, the VSS provides a proprietary interface for managing storage devices.

When the VSS receives a request to create a shadow copy, various actions may occur to prepare for the shadow copy. After the actions are completed and the VSS receives an instruction (e.g., a commit) to finalize the shadow copy, the VSS communicates with the VSS provider to create a shadow copy.

A VSS provider is responsible for causing the appropriate actions to occur on the underlying storage hardware to implement the shadow copy operations received by the VSS. In one sense, the VSS provider may be considered as a translator that translates the requests received from the VSS into a set of one or more requests needed to fulfill the request using the virtual storage simulator 225.

Shadow copy operations may include creating or deleting a shadow copy, importing a shadow copy, exposing a shadow copy, and so forth. The VSS provider may take advantage of specialized storage features when performing a shadow copy operation. For example, some storage hardware may mirror a volume on another volume such that each data write to one volume is also written to the other volume. In such platforms, creating a shadow copy of a volume may involve requesting that the storage hardware split the mirror and expose the shadow copy volume for read/write access. Other storage hardware may not have such built-in features. In such storage hardware, the VSS provider may make a copy of the volume on another volume or may use a differential technique (e.g., copy-on-write) to create a shadow copy.

As there may be many types of storage devices associated with a single computer, there may also be many VSS providers associated with a single VSS service. The VSS service may determine which VSS provider to use depending on the storage device indicated by the application.

The VDS (of VSS/VDS 210) allows a program to query or proactively informs the program as to what storage devices are attached to a computer. In addition, the VDS may also allow a program to configure and manage attached storage devices. In one embodiment, the VDS presents an interface that allows programs to configure, manage, and otherwise interact with storage devices. The programs may communicate with the VDS using a standard set of methods while the VDS communicates with the storage device via a VDS provider that translates instructions depending on the storage device's characteristics. Similar to the VSS, the interface provided by the VDS may be an industry standard interface for managing storage devices or may be a proprietary interface.

In communicating with the storage device, the VDS selects a VDS provider and issues commands to the VDS provider (of VSS/VDS Providers 215). The VDS provider then takes the actions needed by the underlying storage device (which may be different across storage devices) to carry out the commands. In aspects, similar to the VSS provider, the VDS provider may be considered as a translator that translates requests received by the VDS into a set of one or more requests to send to the virtual storage simulator 225.

Some exemplary commands that the VDS may allow include commands to enable or disable automatic mount of the file system for new volumes, to mark a partition as primary (i.e. bootable) or inactive (i.e., unbootable), to repair a RAID-5 volume by replacing a failed member or mirror with a specified dynamic disk, to remove a drive letter or mount point assignment, to grow or shrink volumes, to assign or change a drive letter, and other commands.

For systems having multiple disks in a storage array, the VDS may include commands to select a subsystem, controller, drive, or LUN, to create or delete a LUN, to rescan to locate any new disks that may have been added to the storage array, to unmask/mask a LUN to make it accessible/un-accessible to specific computers for use, to extend or shrink a LUN, and so forth.

In an embodiment, the VSS/VDS providers 215 are created to interact with the virtual storage driver 225 through the stub 220. In this embodiment, the VSS/VDS providers 215 still provide the same interfaces to the VSS/VDS 210, but some of the VSS/VDS providers 215 are structured so that they issue commands to the virtual storage simulator 225 instead of a storage driver associated with an actual storage device. In this embodiment, the VSS/VDS providers 215 that interact with the virtual storage simulator 225 may include a complete set of operations that are available on sophisticated or even non-existent storage devices.

The stub 220 is a component that provides an interface library to communicate with the virtual storage simulator 225. In one embodiment, because the virtual storage simulator 225 executes in kernel mode, a user mode process cannot directly call methods in the virtual storage simulator 225. Instead, a complex set of actions may be involved to pass information back and forth to the virtual storage simulator. These actions may be encapsulated in the stub 220 so that the VSS/VDS providers 215 do not need this functionality. Instead, the VSS/VDS providers 215 may communicate with the stub 220, which then handles the complexities of communicating with the virtual storage simulator 225 across the user mode/kernel mode boundary.

The stub 220 may also allow communication with a virtual storage simulator on another machine. This may be done, for example, to create a simulated storage device on another server. This may be helpful, for example, in testing a remote backup feature where a backup server imports a shadow copy remotely from another server.

The virtual storage simulator 225 simulates a storage device. Such storage devices may include actual storage devices that are currently available and non-available storage devices. A non-available storage device may be simulated, for example, to provide a test bed for a proposed or actual standard that is not currently supported by any available device. Although the virtual storage simulator 225 may be structured to simulate any storage device, it will be readily recognized that the virtual storage simulator 225 may be particularly advantageous in simulating expensive storage devices such as SANs.

In an embodiment, the virtual storage simulator 225 simulates a block level storage device. In a block level storage device, the storage on the storage device is divided into fixed sized blocks that are individually accessible.

The virtual storage simulator 225 may inform the VSS/VDS provider 215 when a new simulated disk is available. The virtual storage simulator 225 may include an API that allows another program to add, remove, or reconfigure simulated disks.

Figure 3:
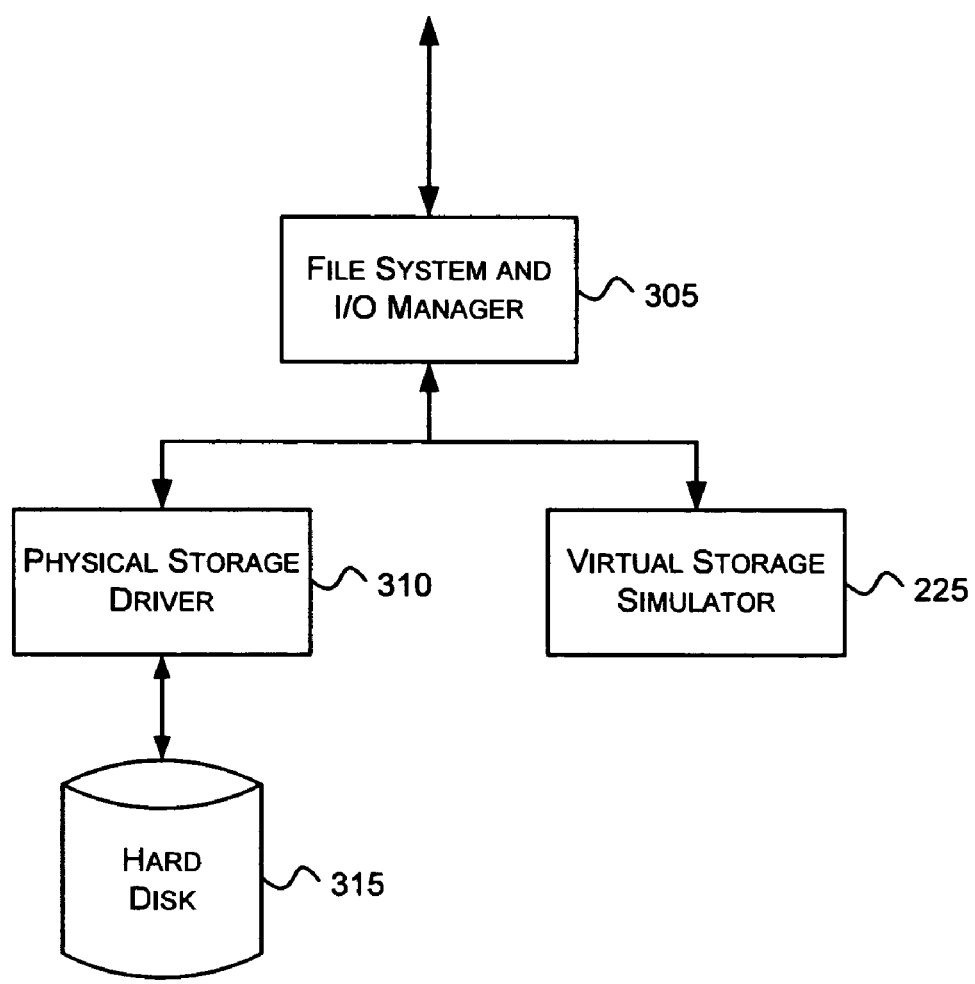
FIG. 3 is a block diagram that generally represents some exemplary components that may be involved when storing and retrieving data in accordance with aspects of the subject matter described herein.

As part of simulating a physical storage device, the virtual simulator 225 may allow data to be stored and retrieved. FIG. 3 is a block diagram that generally represents some exemplary components that may be involved when storing and retrieving data in accordance with aspects of the subject matter described herein. The components include a file system and I/O manager 305, a physical storage driver 310, a hard disk 315, and a virtual storage simulator 225.

The file system and I/O manager 305 may receive data access requests (e.g., reads and/or writes) from a user mode process (e.g., stub 220 of FIG. 2). Based on the storage driver associated with the request, the file system and I/O manager 305 may direct the request to the physical storage driver 310 or the virtual storage simulator 225.

When the virtual storage simulator 225 receives a data access request, the virtual storage simulator 225 may access a file on the hard disk 315 by submitting a data access request to the file system and I/O manager 305 and referencing a file on the hard disk 315. The file system and I/O manager 305 may direct the request from the virtual storage simulator 225 to the physical storage driver 310 which may read or write the data to or from the file on the hard disk 315. The results of the data access are reported to the virtual storage simulator 225 which may then respond appropriately via the file system and I/O manager 305 to the process that requested the data access.

The process that requested the data access need not know that the data it has accessed was on the hard disk 315. As far as the process is concerned, the data access was handled by a storage device simulated by the virtual storage simulator 225.

The virtual storage simulator 225 may also simulate the "mirror" ability of a storage area network or other storage device. Some storage devices mirror the data of a first volume on a second volume. When a write operation is received for the first volume, the write operation is sent to the first volume and the second volume so that the two volumes remain in-synch with each other. In such storage configurations, a shadow copy may be created by breaking the mirror and exposing the second volume. Breaking the mirror comprises ceasing to cause writes to the first volume to also be sent to the second volume. At the time of the break, the second volume is a duplicate of the first volume. It will be appreciated that creating a full shadow copy on storage devices having a mirror ability may be a relatively fast operation.

The virtual storage simulator 225 may simulate the quickness of the mirror ability of a storage device by writing to two or more files for each write request received by the virtual storage simulator 225. To create a shadow copy at a point in time, the virtual storage simulator 225 may cease writing to one of the files for subsequent write operations. The virtual storage simulator 225 may then expose the shadow copy if desired for access by programs seeking to access the shadow copy.

Figure 4:
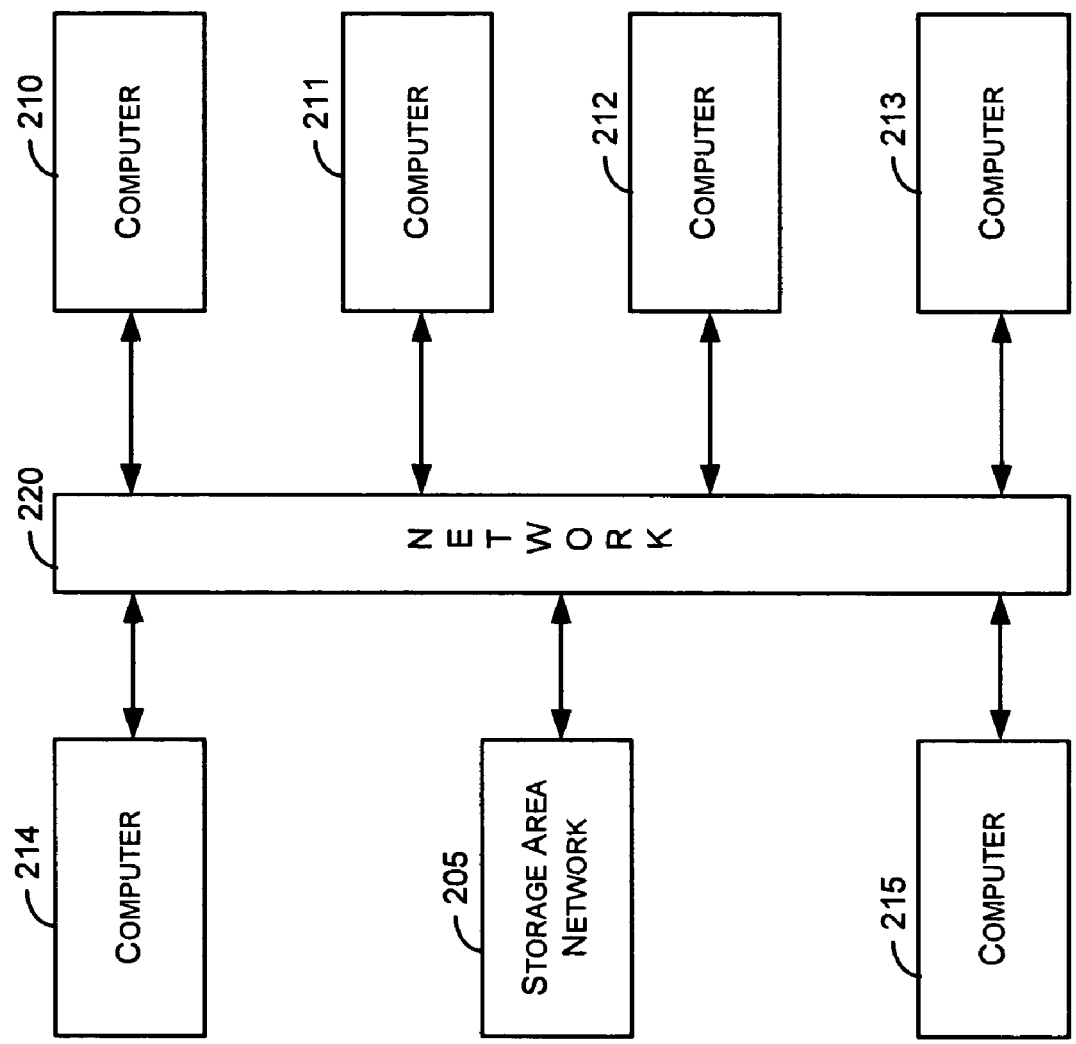
FIG. 4 is a block diagram of an exemplary environment in which aspects of the subject matter described herein may be implemented.

FIG. 4 is a block diagram of an exemplary environment in which aspects of the subject matter described herein may be implemented. The environment includes a storage area network 205 and computers 210-215 connected via the network 220.

The storage area network 205 may include special hardware or software components that take advantage of the configuration of the storage area network 205 to create shadow copies. Each of the computers 210-215 may include components (e.g., VSSs) for creating shadow copies on the storage area network 205. When a shadow copy is created, it may be exposed (e.g., through VSS commands) to more computers than just the computer that requested that the shadow copy be created. For the storage area network 205 this poses no special problem as the storage area network 205 may just assign the shadow copy a LUN and expose the LUN to other computers.

In a simulated virtual storage device, however, sharing shadow copies of simulated storage area network among computers poses additional challenges. For example, if the storage area network 205 is replaced by a computer having a virtual storage area network and that computer create a shadow copy of a volume of a simulated storage area network, certain actions may be performed to allow other computers (e.g., computers 210-215) to access the shadow copy.

In particular, to share the shadow copy, in one embodiment, the file representing the shadow copy and metadata associated therewith is copied to a destination computer that seeks to access the shadow copy. The metadata includes information that precisely defines the shadow copy. This information may include the storage ID (e.g., volume, disk, or LUN ID), and information that defines the type of storage device that is being simulated (e.g., the characteristics of a storage area network). Upon receiving the copy of the shadow copy, the destination computer may import the shadow copy using a VSS method. In importing the shadow copy and its associated metadata, the virtual storage simulator may be informed as to the characteristics of the simulated device associated with the shadow copy. The virtual storage simulator 225 may then simulate the simulated device based on these characteristics.

After the shadow copy and its associated metadata are imported, the destination computer may access the shadow copy through a virtual storage simulator as if the destination computer were accessing the shadow copy on a physical storage device.

In another embodiment, the file representing the shadow copy may be made available to the destination computer through the use of a file share. Metadata regarding the shadow copy may be stored as part of the file share or may be passed directly to the destination computer. After the shadow copy and its metadata are imported, the virtual storage simulator may then use the share to access to shadow copy. To a test application using VSS on the destination computer, the virtual storage simulator makes it appear that the shadow copy is being accessed on a storage area network.

Similar actions as described above may also be used to share simulated volumes other than shadow copies. For example, if a destination computer seeks to gain access to a simulated volume of a SAN, the volume and metadata associated therewith may be copied to the destination computer or a file share to such information provided. The destination computer may then import the volume and its associated metadata so that the virtual storage simulator on the destination computer may be informed as to the characteristics of the volume. After the import, the virtual storage simulator may then simulate the volume appropriately.

Figure 5:
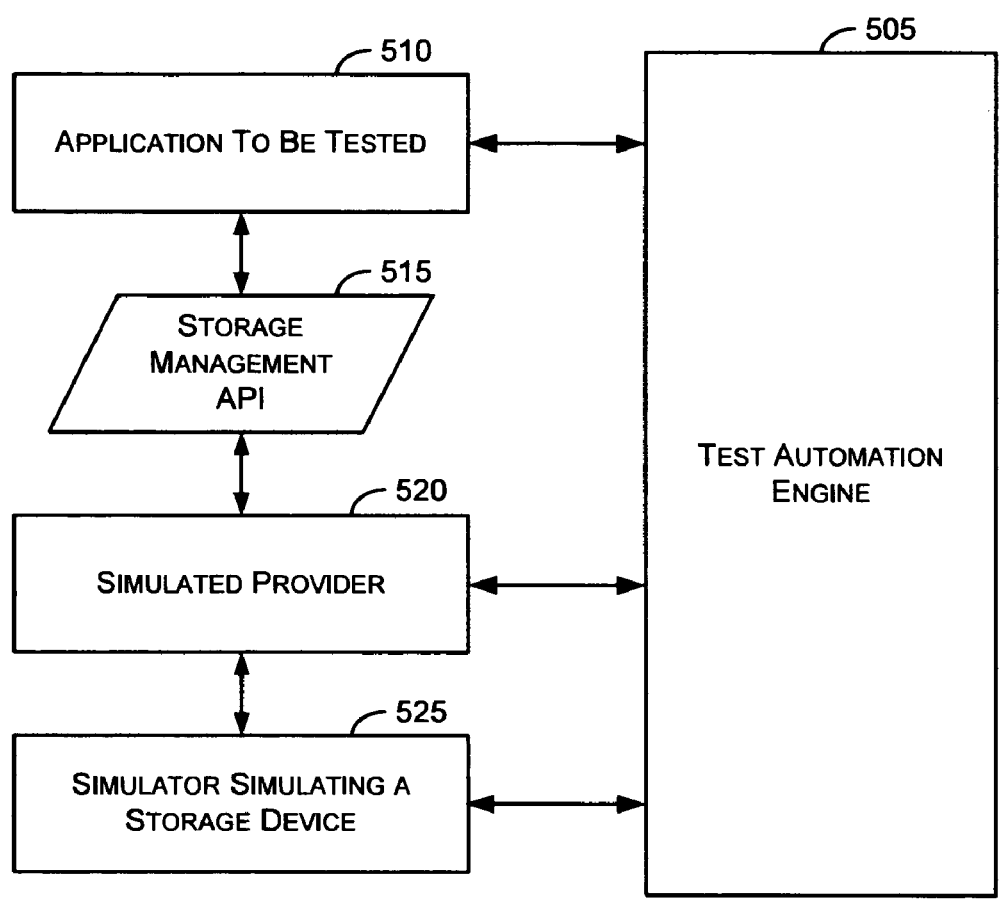
FIG. 5 is a block diagram that generally represents an exemplary testing environment in accordance with aspects of the subject matter described herein.

FIG. 5 is a block diagram that generally represents an exemplary testing environment in accordance with aspects of the subject matter described herein. The testing environment may include a test automation engine 505, an application to be tested 510, a storage management API 515, a simulated provider 520, and a simulator simulating a storage device 525.

The application to be tested 510, the storage management API 515, the simulated provider 520, and the simulator simulated a storage device 525 correspond to the test application 205, the VSS/VDS 210, the VSS/VDS Providers 215, and the virtual storage simulator 225, respectively of FIG. 2 and provide similar functionality.

The test automation engine 505 drives the test process and may communicate with the simulator simulating a storage device 525 to create a simulated LUN, storage area network, or other storage device having the desired characteristics. The test automation engine 505 may simulate error conditions by instructing the simulated provider 520 to return an error to the application to be tested 510 or instructing the virtual storage simulator 525 to return an error to the simulated provider 520. The test automation engine 505 may instruct the application to be tested 510 to attempt to perform any number of storage management and file access operations to test the application. The test automation engine 505 may query the simulator simulating a storage device 525 to determine whether storage management commands issued by the application to be tested 510 have their desired effect.

The test automation engine 505 may also have components on other machines that test other properties of the simulated storage environment including simulated SAN properties, for example.

If needed, multiple servers may be hosted as virtual servers on a single physical machine. This may allow, for example, the simulated testing of a backup application without the need for multiple physical devices connected over a network.

Figure 6A:
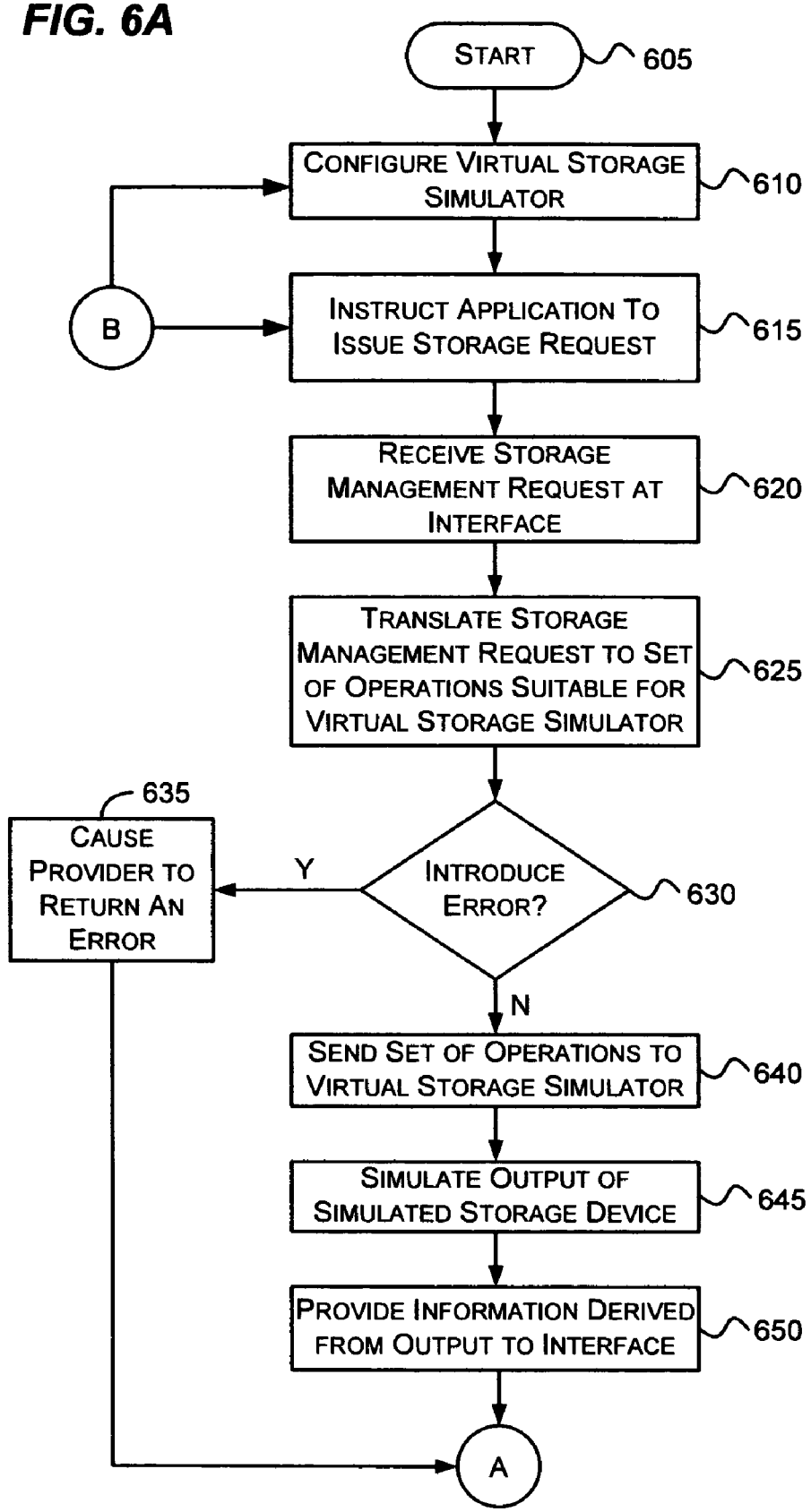
FIGS. 6A and 6B are a flow diagram that generally represents exemplary actions that may occur in testing a storage device in accordance with aspects of the subject matter described herein.
Figure 6B:
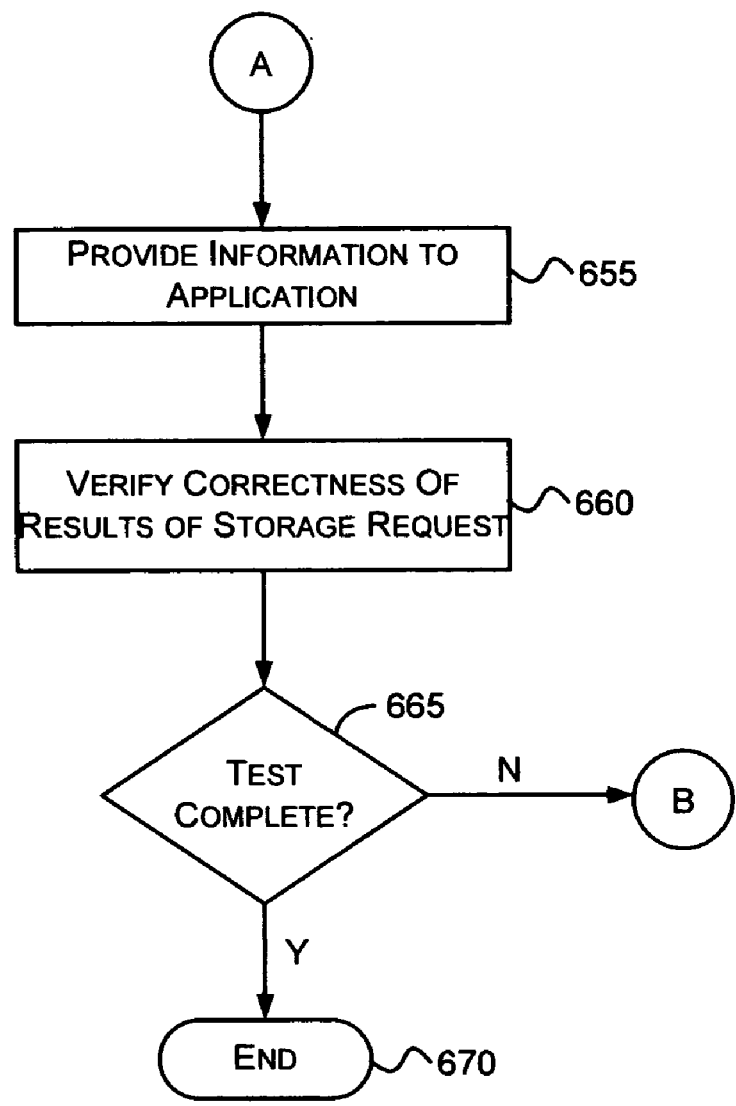

FIGS. 6A and 6B are a flow diagram that generally represents exemplary actions that may occur in testing a storage device in accordance with aspects of the subject matter described herein. Turning to FIG. 6A, at block 605, the actions begin.

At block 610, a virtual storage simulator is configured to simulate a storage device having particular characteristics (e.g., number of LUNS, mirroring capability, shadow copy capabilities, and so forth). For example, referring to FIG. 5, the test automation engine 505, configures the simulator 525 to simulate a storage area network having sophisticated storage management capabilities.

At block 615, an application is instructed to issue a storage request. The storage request may be a storage management request or a storage access request, for example. For example, referring to FIG. 5, the test automation engine 505 instructs the application 510 to issue a storage management request to create a shadow copy.

At block 620, the storage management request is received at an interface (e.g., such as the interface of VSS). For example, referring to FIG. 5, the application 510 uses a method of the storage management API 515 to request the creation of a shadow copy.

At block 625, the storage management request is translated to a set of one or more operations suitable for the storage simulated by the virtual storage simulator. For example, referring to FIG. 5, if the storage simulator 525 is simulating supports breaking a mirror, the simulator provider 520 translates the shadow copy request into a request to break the mirror to create the shadow copy.

At block 630, a determination is made as to whether an error is to be introduced. If so, the actions continue at block 635; otherwise, the actions continue at block 640. For example, referring to FIG. 5, the test automation engine 505 may instruct the provider 520 to return an error to the application 510. At block 635, the provider is caused to return an error.

At block 640, the set of operations are sent to the virtual storage simulator. For example, referring to FIG. 5, the provider 520 sends a command to break the mirror to the simulator 525.

At block 645, the simulator simulates the output of the simulated storage device. For example, referring to FIG. 5, the simulator 525 returns a code that indicates that the mirror was successfully broken and a shadow copy created.

At block 650, information derived from the output is forwarded to the interface. When a provider uses multiple operations to fulfill a request, it may receive multiple responses from the virtual storage simulator. The application that requested a storage request, however, may expect a single response. To fulfill the expectations of the application, information may be derived from the responses (e.g., all succeeded) to provide a response suitable (e.g., success) to the application.

After block 650, the actions continue at block 655. At block 655, the derived information is provided to the application. For example, referring to FIG. 5, the storage management API 515 may indicate to the application 510 whether the request succeeded and may also provide additional information regarding the request (e.g., the name of the volume containing the shadow copy).

At block 660, the correctness of the results of the storage request may be verified. For example, referring to FIG. 5, the test automation engine 505 may query the simulator 525 to determine whether a shadow copy was indeed created or whether an error resulted.

At block 665, a determination is made as to whether the test or a suite of test has completed. If so, the actions continue at block 670; otherwise, the actions continue at blocks 610 or 615 of FIG. 6A. For example, referring to FIG. 5, if the test automation engine 505 determines that all tests have been completed, the test automation engine 505 may not perform any more tests. Otherwise, the test automation engine 505 may configure the simulator 525 to simulate a storage device having different characteristics (e.g., block 610 of FIG. 6A) and run a suite of tests against the new simulated storage device or may begin another test against a currently simulated storage device (e.g., block 615 of FIG. 6A).

At block 670, the actions end. The actions described in conjunction with FIGS. 6A and 6B may be repeated to perform additional tests.

In one embodiment, the actions described in conjunction with FIGS. 6A and 6B are not all-inclusive of all the actions that may be taken in testing a storage device. Furthermore, although the actions are described as occurring in a particular order, in other embodiments, some of the actions may occur in parallel, may be performed with other actions, or may be performed in another order without departing from the spirit or scope of the subject matter described herein.

It will be appreciated that aspects of the subject matter described above allow a storage device to be tested on virtually any computer. Furthermore, by using virtual machines, tests that may need multiple machines (e.g., backing up remote shadow copies), may be performed on a single physical machine.

As can be seen from the foregoing detailed description, aspects have been described related to simulating storage devices. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented within a computing environment, the method comprising:
    in a computing environment comprising at least one computer processor, a physical computer-readable memory, and performing:
    configuring a software based simulator to simulate a storage device;
    receiving a storage management request at a storage management interface, wherein the storage management interface is capable of receiving requests regarding a plurality of storage devices having different management capabilities;
    translating the storage management request into a set of one or more requests for the simulator, wherein the set of one or more requests depends at least in part on characteristics of the storage device;
    sending the set of one or more requests to the simulator;
    simulating, by the simulator, output associated with the storage device in response to the set of one or more requests; and
    providing to the interface information derived from the output.

2. The method of claim 1, wherein the storage device comprises a storage area network.

3. The method of claim 1, further comprising receiving a first data access request directed to the simulator, and, in response, sending a second data access request derived from the first data access request to a physical storage device.

4. The method of claim 1, wherein the storage management request comprises a request to create a shadow copy of a volume of the storage device.

5. The method of claim 1, wherein the storage management request comprises one or more of a request to import and a request to expose a shadow copy of a volume of the storage device to a remote host.

6. The method of claim 5, wherein simulating, by the simulator, output associated with the storage device in response to the set of one or more requests comprises copying a file associated with the shadow copy of the volume and metadata including properties of the storage device to a host hosting the remote process and importing the metadata to configure a storage device simulator on the host.

7. The method of claim 5, wherein a single physical computer executes the remote process in a first virtual machine and the simulator in a second virtual machine.

8. The method of claim 5, wherein the simulating, by the simulator, output associated with the storage device in response to the set of one or more requests comprises creating a file share with which to access the shadow copy of the volume of the storage device.

9. The method of claim 1, wherein the storage management request comprises a request to create, delete, mask, unmask, extend or shrink a logical unit number (LUN).

10. A computer-readable storage medium having encoded thereon computer-executable instructions which, when executed upon one or more computer processors, instantiate components comprising:
    a software based simulator operable to simulate a storage area network;
    an interface operable to receive a management request related to the storage area network, wherein the interface is capable of receiving management requests regarding a plurality of storage devices having different management capabilities;
    a provider operable to translate the management request into a set of one or more requests and to send the set of one or more requests to the simulator; and
    a test automation engine operable to communicate to the simulator characteristics of the storage area network.

11. The computer-readable storage medium of claim 10, further comprising an application operable to issue the management request related to the storage area network.

12. The computer-readable storage medium of claim 10, wherein the management requests comprise one or more of a request to enable an automatic mount of a file system for a new volume, to disable an automatic mount of a file system of a new volume, to mark a partition as bootable, to mark a partition as unbootable, to replace a failed volume with another volume, to grow a volume, to shrink a volume, to assign a drive letter to a volume, to change the drive letter of a volume, to select a subsystem, controller, drive, or logical unit number of the storage area network, to create or delete a logical unit number of the storage area network, to rescan to locate any new disks that have been added to the storage area network, to make a logical unit number of the storage area network accessible to specified computers, to make a logical unit number of the storage area network un-accessible to specified computers, and to extend or shrink a logical unit number of the storage area network.

13. The computer-readable storage medium of claim 10, wherein the set of one or more requests comprise one or more of creating a shadow copy of a volume, importing and exposing the shadow copy to a remote device.

14. The computer-readable storage medium of claim 13, wherein exposing the shadow copy to a remote device comprises copying the shadow copy to the remote device together with metadata that includes characteristics of the storage area network, importing the shadow copy on the remote device, and configuring a simulator on the remote device to simulate a storage area network having the characteristics in providing access to the shadow copy.

15. The computer-readable storage medium of claim 13, wherein exposing the shadow copy to a remote device comprises creating a file share that provides access to the shadow copy to the remote device and providing the remote device with metadata that includes characteristics of the storage area network.

16. In a computing environment, an apparatus, comprising:
one or more computer processors and a computer-readable storage medium having encoded thereon computer-executable instructions which, when executed upon one or more computer processors, instantiate:
a storage management interface operable to receive a storage management request related to storage;
a provider operable to translate the storage management request into a set of operations applicable to the storage;
a virtual storage simulator operable to simulate the storage; and
a stub operable to communicate the set of operations to the virtual storage simulator.

17. The apparatus of claim 16, further comprising code that comprises an application operable to issue the storage management request in response to a command from a test automation engine.

18. The apparatus of claim 16, further comprising a test automation engine operable to inject one or more of a controlled error and a fault.

19. The apparatus of claim 16, wherein the storage comprises a storage area network that is addressable using logical unit numbers and block numbers.

* * * * *